(12) United States Patent
Shimizu et al.

(10) Patent No.: US 8,258,196 B2
(45) Date of Patent: Sep. 4, 2012

(54) METHOD FOR PRODUCING RIGID POLYURETHANE FOAM, AND RIGID POLYURETHANE FOAM

(75) Inventors: Katsuhiko Shimizu, Kamisu (JP); Teruhiko Yasuda, Kamisu (JP); Hiroshi Wada, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/469,178

(22) Filed: May 20, 2009

(65) Prior Publication Data
US 2009/0234036 A1 Sep. 17, 2009

Related U.S. Application Data

(63) Continuation of application No. PCT/JP2007/072471, filed on Nov. 20, 2007.

(30) Foreign Application Priority Data

Nov. 20, 2006 (JP) ................................. 2006-312813

(51) Int. Cl.
*C08G 77/46* (2006.01)
(52) U.S. Cl. ........ 521/111; 521/112; 521/127; 521/128; 521/129; 521/130; 521/131; 521/164; 521/167; 521/170; 521/174; 521/177; 521/163
(58) Field of Classification Search .................. 521/111, 521/112, 127, 128, 129, 130, 131, 164, 167, 521/174, 177, 163, 170
See application file for complete search history.

(56) References Cited

U.S. PATENT DOCUMENTS

| 3,070,556 | A | * | 12/1962 | Merten et al. | 521/111 |
|---|---|---|---|---|---|
| 4,246,360 | A | * | 1/1981 | Brown et al. | 521/102 |
| 4,350,777 | A | * | 9/1982 | Henrichs et al. | 521/110 |
| 5,149,725 | A | | 9/1992 | Genz et al. | |
| 5,177,116 | A | * | 1/1993 | Genz et al. | 521/110 |
| 5,998,494 | A | * | 12/1999 | Hamilton | 521/166 |
| 6,335,378 | B1 | * | 1/2002 | Colman | 521/131 |
| 6,384,098 | B1 | * | 5/2002 | Suk et al. | 521/174 |
| 6,887,913 | B2 | | 5/2005 | Hotta et al. | |
| 2002/0091170 | A1 | | 7/2002 | Sakata et al. | |

FOREIGN PATENT DOCUMENTS

| DE | 102 27 072 A1 | 12/2003 |
|---|---|---|
| FR | 1240302 | 9/1960 |
| JP | 57-117524 | 7/1982 |
| JP | 57-25313 | 10/1982 |
| JP | 08-269822 | 10/1996 |
| JP | 11-302340 | 11/1999 |
| JP | 2001-188412 | 7/2001 |
| JP | 2002-187929 | 7/2002 |
| JP | 2004-075700 | 3/2004 |
| WO | 2008-062792 | 5/2008 |

OTHER PUBLICATIONS

U.S. Appl. No. 12/469,296, filed May 20, 2009, Yasuda, et al.
U.S. Appl. No. 12/468,963, filed May 20, 2009, Wada, et al.
Extended European Search Report issued Dec. 3, 2010, in Application No. / Patent No. 07832201.3-1214 / 2085412 PCT/JP2007072471.

* cited by examiner

*Primary Examiner* — John Cooney
(74) *Attorney, Agent, or Firm* — Oblon, Spivak, McClelland, Maier & Neustadt, L.L.P.

(57) ABSTRACT

To provide a method for producing a rigid polyurethane foam, whereby it is possible to reduce the density without causing deterioration in dimensional stability, and a rigid polyurethane foam.

A method for producing a rigid polyurethane foam, which comprises a step of reacting a polyol having a hydroxyl value of from 200 to 800 mgKOH/g with a polyisocyanate compound in the presence of an amino-modified silicone, a catalyst, a blowing agent and a surfactant.

14 Claims, No Drawings

METHOD FOR PRODUCING RIGID POLYURETHANE FOAM, AND RIGID POLYURETHANE FOAM

TECHNICAL FIELD

The present invention relates to a method for producing a rigid polyurethane foam, and a rigid polyurethane foam obtainable by such a method.

BACKGROUND ART

It is common to produce a rigid foamed synthetic resin such as a rigid polyurethane foam or a rigid polyisocyanurate foam (hereinafter referred to as "a rigid foam") by reacting a polyol component with a polyisocyanate component in the presence of a blowing agent, etc., and use it as a heat-insulating material having closed cells. As a blowing agent to be used for such a rigid foam, a hydrofluorocarbon compound or a hydrocarbon compound having a low boiling point is mainly used.

With respect to a rigid foam, further density reduction of the foam is desired in order to reduce the cost or the weight by reducing the amount of the raw material to be used. However, there is a problem such that along with the density reduction of a foam, the strength of the foam tends to decrease, and the dimensional stability is likely to deteriorate such that the rigid foam represented by a board is likely to undergo shrinkage.

Further, in consideration of a load to the environment, it has been studied to reduce a low boiling point hydrofluorocarbon compound and increase water, or in consideration of the flammability, it has been studied to reduce a hydrocarbon compound and increase water, or a technique has been studied to use only water as a blowing agent without using a low boiling point hydrofluorocarbon compound or hydrocarbon compound.

However, in a case where density reduction of a foam is attempted by using water in combination, or density reduction of a foam is attempted by water-foaming by carrying out foaming by means of only water, the foam tends to be remarkably susceptible to shrinkage, thus leading to deterioration in dimensional stability of the foam.

In order to attain both the density reduction and the dimensional stability, it is conceivable to make cells of the foam to be open cells. However, if cells are made to be open cells, heat-insulating properties will be poor, although the dimensional stability may thereby be improved.

Further, as prior art to prevent shrinkage of a foam to maintain the dimensional stability, a method is known wherein a polymer-dispersed polyol is added to a polyol compound to produce a rigid foam (Patent Documents 1 and 2). The polymer-dispersed polyol is a polyol having polymer particles dispersed in a polyol such as a polyether polyol or a polyester polyol, and it has been used in many cases as a raw material for polyurethane foams such as flexible foams or semi-rigid foams, in order to improve the mechanical properties of such polyurethane foams.

Further, as a case where a polyurethane foam is produced by using an amino-modified silicone, a method for producing a polyurethane foam for abrasive sheet, wherein cell diameters of the foam are widely distributed (Patent Document 3), a method to provide an elastic member having a small frictional resistance on its surface and having fine cells Patent Document 4), or a method for producing a polyurethane having excellent moldability and appearance, when molded by a reaction injection molding method (Patent Document 5), is known.

However, each of such cases disclosed in Patent Documents 3 to 5 is a technique relating to the production of a flexible polyurethane foam and thus is different from the present invention in the object and application.

Patent Document 1: JP-A-57-25313
Patent Document 2: JP-A-11-302340
Patent Document 3: JP-A-2004-75700
Patent Document 4: JP-A-2002-187929
Patent Document 5: JP-A-57-117524

DISCLOSURE OF THE INVENTION

Problems to be Solved by the Invention

As mentioned above, for a rigid foam, it is desired to realize density reduction without bringing about deterioration in the dimensional stability. More preferably, a rigid foam is desired which has a low density and good dimensional stability and which is excellent in heat-insulating properties.

However, in the method for producing a rigid foam by adding a polymer-dispersed polyol to a polyol as disclosed in Patent Documents 1 and 2, improvement in the heat-insulating properties is limited although the dimensional stability of the foam may be improved.

The present invention has been made under these circumstances, and it is an object of the present invention to provide a method for producing a rigid polyurethane foam, which is capable of realizing density reduction without bringing about deterioration in the dimensional stability, and such a rigid polyurethane foam.

Further preferably, it is an object to provide a method for producing a rigid polyurethane foam which has a low density and good dimensional stability and which further has sufficient heat-insulating properties, and such a rigid polyurethane foam.

Means to Solve the Problems

The present invention provides the following.
(1) A method for producing a rigid polyurethane foam, which comprises a step of reacting a polyol having a hydroxyl value of from 200 to 300 mgKOH/g with a polyisocyanate compound in the presence of an amino-modified silicone, a catalyst, a blowing agent and a surfactant.
(2) The method for producing a rigid polyurethane foam according to the above (1), wherein the amino-modified silicone is from 0.001 to 1.0 parts by mass per 100 parts by mass of the polyol.
(3) The method for producing a rigid polyurethane foam according to the above (1) or (2), wherein the amino-modified silicone has an amino equivalent of from 100 to 100,000 g/mol.
(4) The method for producing a rigid polyurethane foam according to any one of the above (1) to (3), wherein the amino-modified silicone is at least one member selected from the group consisting of a compound represented by the following formula (1) and a compound represented by the following formula (2):

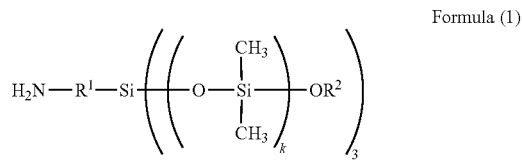

Formula (1)

-continued

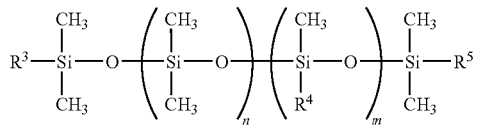

Formula (2)

wherein in the formula (1), $R^1$ is a $C_{1-10}$ alkylene group, $R^2$ is a $C_{1-10}$ alkyl group, and k is an integer of from 1 to 2,000, and in the formula (2), m is an integer of from 0 to 100, n is an integer of from 1 to 2,000, each of $R^3$, $R^4$ and $R^5$ which may be the same or different from one another, is a group selected from the group consisting of a $C_{1-10}$ alkyl group, a $C_{1-10}$ alkoxy group and a $C_{1-10}$ alkyl group having a nitrogen atom (provided that when m is 0, at least one of $R^3$ and $R^5$ is a $C_{1-10}$ alkyl group having a nitrogen atom, and when m is an integer of from 1 to 100, at least one selected from $R^3$, $R^5$ and $mR^4$, is a $C_{1-10}$ alkyl group having a nitrogen atom).
(5) The method for producing a rigid polyurethane foam according to any one of the above (1) to (4), wherein the blowing agent is water alone or a combination of water and at least one member selected from the group consisting of a hydrofluorocarbon and a hydrocarbon compound.
(6) The method for producing a rigid polyurethane foam according to any one of the above (1) to (5), wherein the polyol is a polyol containing a polyether polyol obtained by adding a compound having one three-membered cyclic ether to an initiator.
(7) The method for producing a rigid polyurethane foam according to any one of the above (1) to (6), wherein the initiator is a polyhydric alcohol, a polyhydric phenol or an amino compound.
(8) The method for producing a rigid polyurethane foam according to any one of the above (1) to (7), wherein the polyisocyanate compound is tolylene diisocyanate, diphenylmethane diisocyanate, a polymethylenepolyphenyl isocyanate or a modified product thereof.
(9) The method for producing a rigid polyurethane foam according to any one of the above (1) to (8), wherein the catalyst is triethylenediamine, bis(2-dimethylaminoethyl) ether, N,N,N',N'-tetramethylhexamethylenediamine or dibutyltin dilaurate.
(10) A rigid polyurethane foam produced by the method for producing a rigid polyurethane foam as defined in any one of the above (1) to (9).

Effects of the Invention

According to the present invention, it is possible to obtain a rigid polyurethane foam which has a low density and good dimensional stability and which further has sufficient heat-insulating properties.

BEST MODE FOR CARRYING OUT THE INVENTION

Polyol

In the present invention, as the polyol, a polyol having a hydroxyl value of from 200 to 800 mgKOH/g is used. The average number of functional groups of such a polyol is preferably from 3 to 6. Here, the functional groups mean hydroxyl groups, carboxyl groups, amino groups, etc., which are reactive with isocyanate groups, and the number of functional groups means the number of active hydrogen.

Such polyols may be used alone or in combination as a mixture of two or more of them. In a case where two or more polyols are used in combination, the hydroxyl values of the respective polyols before mixing may be in the above range. When the hydroxyl value of the polyol is at least 200 mgKOH/g, the resin strength tends to be readily obtainable and the dimensional stability will be good. When the hydroxyl value is at most 800 mgKOH/g, the viscosity can be controlled to be low, and the mixing properties with the isocyanate compound will be improved, whereby fine cells may be readily formed, and the heat-insulating properties can be readily improved. The hydroxyl value is preferably from 250 mgKOH/g to 700 mgKOH/g, more preferably from 300 mgKOH/g to 600 mgKOH/g.

The polyol may, for example, be any one of a polyether polyol, a polyester polyol, a polycarbonate polyol, etc.

It is particularly preferred to use a polyether polyol alone or to use a polyether polyol as an essential component in combination with a polyester polyol and/or a hydrocarbon polymer having hydroxyl groups at its terminals. Here, "use a polyether polyol as an essential component" means that the proportion of the polyether polyol is at least 20 mass % in the entire polyols to be used. Such a proportion of the polyether polyol is preferably at least 30 mass % or may be 100 mass %. It is most preferably from 30 mass % to 100 mass %.
Polyether Polyol The polyether polyol may be a polyether polyol obtained by adding a cyclic ether such as an alkylene oxide to an initiator such as an amine or a polyhydroxy compound such as a polyhydric alcohol or a polyhydric phenol.

The initiator may specifically be the following compounds and their cyclic ether adducts, or a mixture of two or more of them: a polyhydric alcohol such as ethylene glycol, diethylene glycol, propylene glycol, dipropylene glycol, neopentyl glycol, 3-methyl-1,5-pentanediol, 1,4-butanediol, 1,6-hexanediol, water, glycerin, trimethylolpropane, 1,2,6-hexanetriol, pentaerythritol, diglycerin, tetramethylolcyclohexane, methyl glucoside, sorbitol, mannitol, dulcitol, sucrose or triethanolamine; a polyhydric phenol such as bisphenol A, or an initial condensate of phenol/formaldehyde; an amino compound such as piperazine, aniline, monoethanolamine, diethanolamine, isopropanolamine, aminoethylethanolamine, ammonia, aminomethylpiperazine, aminoethylpiperazine, ethylenediamine, propylenediamine, hexamethylenediamine, tolylenediamine, xylylenediamine, diphenylmethanediamine, diethylenetriamine or triethylenetetramine.

The cyclic ether may, for example, be a 3- to 6-membered cyclic ether compound having one oxygen atom in the ring and may specifically be the following compounds: a compound having a 3-membered cyclic ether group such as ethylene oxide, propylene oxide, isobutylene oxide, 1-butene oxide, 2-butene oxide, trimethylethylene oxide, tetramethylethylene oxide, butadiene monooxide, styrene oxide, α-methylstyrene oxide, epichlorohydrin, epifluorohydrin, epibromohydrin, glycidol, butyl glycidyl ether, hexyl glycidyl ether, phenyl glycidyl ether, 2-chloroethyl glycidyl ether, o-chlorophenyl glycidyl ether, ethylene glycol diglycidyl ether, bisphenol A diglycidyl ether, cyclohexene oxide, dihydronaphthalene oxide or vinyl cyclohexene monooxide; or a compound having a 4- to 6-membered cyclic ether group, such as oxetane, tetrahydrofuran or tetrahydropyran.

Preferred is a compound having a 3-membered cyclic ether group (monoepoxide), and particularly preferred is a $C_{2-4}$ alkylene oxide, such as ethylene oxide, propylene oxide, isobutylene oxide, 1-butene oxide or 2-butene oxide.

Such cyclic ethers may be used alone or in combination as a mixture of two or more of them. In a case where two or more cyclic ethers are to be used in combination, they may be mixed and reacted, or may be sequentially reacted. Such cyclic ethers are particularly preferably $C_{2-4}$ alkylene oxides, and when used alone, propylene oxide is preferred and when used in combination, a combination of propylene oxide and ethylene oxide is preferred.

Polyester Polyol

The polyester polyol may, for example, be a polyester polyol obtained by polycondensation of a polyhydric alcohol with a polyvalent carboxylic acid. As other examples, polyester polyols may be mentioned which are obtainable by, for example, polycondensation of a hydroxy carboxylic acid, polymerization of a cyclic ester (lactone), poly-addition of a Cyclic ether to a polycarboxylic anhydride, and a transesterification of a waste polyethylene terephthalate.

Amino-Modified Silicone

In the present invention, an amino-modified silicone having a silicone atom and a nitrogen atom in its molecule, is used. In the present invention, the above mentioned polyol is reacted with an isocyanate compound in the presence of the amino-modified silicone together with a catalyst, a blowing agent and a surfactant. By the use of the amino-modified silicone, the dimensional stability can be improved, and density reduction can be realized without bringing about deterioration in the dimensional stability.

The amino-modified silicone preferably has an amino equivalent of from 100 to 100,000 g/mol, more preferably from 1,000 to 10,000 g/mol. When the amino equivalent is at least 100 g/mol, the stability of the foam can be improved, and when the amino equivalent is at most 100,000 g/mol, the properties of the foam can be improved with a small amount, and it becomes possible to readily obtain the effects of the present invention. Here, the amino equivalent can be obtained by a usual neutralization titration method. For example, it can be calculated by a neutralization titration method disclosed in JIS K7245 (published in 2000).

The amino-modified silicone may specifically preferably be at least one member selected from the group consisting of a compound represented by the following formula (1) and a compound represented by the following formula (2):

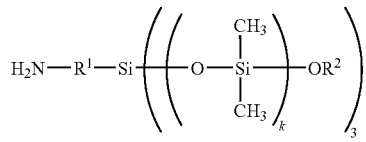
Formula (1)

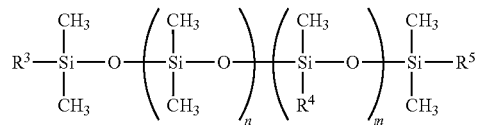
Formula (2)

In the above formula (1), $R^1$ is a $C_{1-10}$ alkylene group, which may be linear or branched. The number of carbon atoms in the alkylene group is from 1 to 10, preferably from 1 to 8, more preferably from 1 to 5. Specifically, it may, for example, be a methylene group, an ethylene group, a propylene group or a butylene group.

$R^2$ is a $C_{1-10}$ alkyl group, which may be linear or branched. The number of carbon atoms in the alkyl group is from 1 to 10, preferably from 1 to 8, more preferably from 1 to 5. Specifically, it may, for example, be a methyl group, an ethyl group, a propyl group or a butyl group. The three $R^2$ present in one molecule may be the same or different.

k is an integer of from 1 to 2,000, preferably an integer of from 1 to 1,500, more preferably an integer of from 1 to 1,000. When k is within a range of from 1 to 2,000, foaming of the foam will be more stabilized. Here, the three k in one molecule may be the same or different.

In the above formula (2), m is an integer of from 0 to 100, preferably an integer of from 0 to 50. When m is within a range of from 0 to 100, foaming of the foam can be stabilized.

n is an integer of from 1 to 2,000, preferably an integer of from 1 to 1,500, more preferably an integer of from 1 to 1,000, further preferably an integer of from 1 to 200. When n is within a range of from 1 to 2,000, foaming of the foam will be more stabilized.

Each of $R^3$, $R^4$ and $R^5$ which may be the same or different from one another, is a group selected from the group consisting of a $C_{1-10}$ alkyl group, a $C_{1-10}$ alkoxy group and a $C_{1-10}$ alkyl group having a nitrogen atom.

The alkyl group may be linear or branched. The number of carbon atoms in the alkyl group is from 1 to 10, preferably from 1 to 8, more preferably from 1 to 5. Specifically, it may, for example, be a methyl group, an ethyl group, a propyl group or a butyl group.

The alkoxy group may be linear or branched. The number of carbon atoms in the alkoxy group is from 1 to 10, preferably from 1 to 8, more preferably from 1 to 5. Specifically, it may, for example, be a methoxy group, an ethoxy group, a propoxy group or a butoxy group.

In the present invention, "an alkyl group having a nitrogen atom" means a group having at least one hydrogen atom in an alkyl group substituted by an amine.

Such an amine may be a primary amine, a secondary amine or a tertiary amine. The primary amine is one having one hydrogen atom in an amine substituted by an alkyl group in "an alkyl group having a nitrogen atom". The secondary or tertiary amine is one further substituted by a hydrocarbon group other than the above alkyl group (provided that the hydrocarbon group may further be substituted by an amine). In such a case, the carbon atoms present in such a hydrocarbon group will be included in the number of carbon atoms.

The alkyl group having a nitrogen atom may be linear or branched. The number of carbon atoms in such an alkyl group is from 1 to 10, preferably from 1 to 8, more preferably from 1 to 5.

The number of nitrogen atoms in such an alkyl group, i.e. the number of amines as substituents, is preferably from 1 to 3.

Specific examples of the alkyl group having a nitrogen atom include an aminomethyl group, an aminoethyl group, an aminopropyl group, an aminohexyl group, an aminooctyl group, an N,N-dimethylaminoethyl group, an N,N-diethylaminoethyl group, an N,N-dimethylaminopropyl group, an N-(aminoethyl)aminopropyl group ($—C_3H_6—NH—C_2H_4—NH_2$), an N—(N'-aminoethyl)aminoethyl)aminopropyl group ($—C_3H_6—NH—C_2H_4—NH—C_2H_4—NH_2$), etc.

Among them, an alkyl group having an active hydrogen atom bonded to a nitrogen atom i.e. an alkyl group substituted by a primary amine or secondary amine, is preferred from such a viewpoint that the finally obtainable rigid urethane foam will be free from bleed out.

In the above formula (2), when m is 0, at least one of $R^3$ and $R^5$ is a $C_{1-10}$ alkyl group having a nitrogen atom, and more preferably, each of $R^3$ and $R^5$ is a $C_{1-10}$ alkyl group having a nitrogen atom.

When m is an integer of from 1 to 100, at least one selected from $R^3$, $R^5$ and $mR^4$, is a $C_{1-10}$ alkyl group having a nitrogen atom, and more preferably, $R^4$ is a $C_{1-10}$ alkyl group having a nitrogen atom, and each of $R^3$ and $R^5$ is a $C_{1-10}$ alkyl group or a $C_{1-10}$ alkoxy group, or at least two among $R^3$, $R^4$ and $R^5$ are $C_{1-10}$ alkyl groups having a nitrogen atom.

Here, when m is an integer of at least 2, $mR^4$ may be the same or different.

Further, the main chain comprising (m+n) siloxane units may be a block copolymer chain or a random copolymer chain.

Such an amino-modified silicone is available from commercial products, or may be prepared by a known method.

In the present invention, such amino-modified silicones may be used alone or in combination as a mixture of two or more of them.

The amount of the amino-modified silicone to be used is not particularly limited. However, in order to satisfy both the dimensional stability and the heat-insulating properties, it is preferably from 0.001 to 1.0 part by mass, more preferably from 0.01 to 1.0 part by mass, further preferably from 0.01 to 0.5 part by mass per 100 parts by mass of the polyol. When it is at least 0.001 part by mass, the effects of the present invention can be obtained, and the above mentioned properties of the foam may be improved. When it is at most 1.0 part by mass, an increase in the thermal conductivity can be well controlled.

Polyisocyanate Compound

The polyisocyanate compound is not particularly limited, and it may, for example, be an aromatic, alicyclic or aliphatic polyisocyanate having at least two isocyanate groups; a mixture of two or more such polyisocyanates; or a modified polyisocyanate obtainable by modifying it. A specific example may, for example, be a polyisocyanate such as tolylene diisocyanate (TDI), diphenylmethane diisocyanate (TDI), polymethylenepolyphenyl isocyanate (so-called crude MDI), xylylene diisocyanate (XDI), isophorone diisocyanate (IPDI) or hexamethylene diisocyanate (HMDI), or a prepolymer type modified product, an isocyanaurate modified product, a urea modified product or a carbodiimide modified product thereof. Among them, TDI, MDI, crude MDI or a modified product thereof is preferred.

The amount of the polyisocyanate compound to be used is preferably from 50 to 300 as represented by 100 times the number of isocyanate groups to the total number of active hydrogen in the polyol compound and other active hydrogen compounds (the numerical value represented by such 100 times is usually referred to as an isocyanate index).

In the polyurethane formulation employing mainly an urethane-foaming catalyst as the catalyst, the amount of the polyisocyante compound to be used is preferably from 50 to 140, more preferably from 60 to 130, by isocyanate index.

Further, in the polyisocyanurate formulation wherein a catalyst to promote a trimerization reaction of an isocyanate group is mainly used as the catalyst (the urethane-modified polyisocyanurate formulation), the amount of the polyisocyanate compound to be used is preferably from 120 to 300, more preferably from 150 to 250, by isocyanate index.

Blowing Agent

As the blowing agent, a known one may suitably be employed. However, it is preferably water alone or a combination of water and at least one member selected from the group consisting of a hydrofluorocarbon and a hydrocarbon compound. Particularly preferred is water alone.

The hydrocarbon compound may, for example, be butane, n-pentane, isopentane, cyclopentane, hexane or cyclohexane.

The hydrofluorocarbon may, for example, be 1,1,1,3,3-pentafluoropropane (HFC-245fa), 1,1,1,3,3,-pentafluorobutane (HFC-365mfc) or 1,1,1,2-tetrafluoroethane (HFC-134a).

In a case where water is used alone as the blowing agent, its amount is preferably from 1 to 15 parts by mass, more preferably from 2 to 13 parts by mass, further preferably from 4 to 12 parts by mass, per 100 parts by mass of the polyol. When the amount of water is at least 1 part by mass, such is preferred with a view to weight reduction of the obtainable rigid foam. On the other hand, when the amount is at most 15 parts by mass, mixing of water with the polyol compound will be facilitated, such being desirable.

In a case where water and a hydrocarbon are used in combination, the preferred range of the amount of water to be used is the same as mentioned above, and the amount of the hydrocarbon compound is preferably from 8 to 30 parts by mass per 100 parts by mass of the polyol.

In a case where water and a hydrofluorocarbon are used in combination, a preferred range of the amount of water to be used is preferably from 0.1 to 5 parts by mass, more preferably from 0.1 to 4 parts by mass, further preferably from 0.5 to 3 parts by mass, per 100 parts by mass of the polyol. Further, the amount of the hydrofluorocarbon to be used is preferably from 10 to 60 parts by mass per 100 part by mass of the polyol.

Catalyst

The catalyst is not particularly limited so long as it is a catalyst to promote the urethane-foaming reaction. It may, for example, be a tertiary amine such as triethylenediamine, bis (2-dimethylaminoethyl)ether or N,N,N',N'-tetramethylhexamethylenediamine; or an organometallic compound such as dibutyltin dilaurate.

Further, a catalyst to promote a trimerization reaction of an isocyanate group may be used in combination. As a specific example, a metal salt of a carboxylic acid such as potassium acetate or potassium 2-ethylhexanoate may, for example, be mentioned.

Further, in a case where spray foaming is employed as a method for producing a rigid foam, it is preferred to use an organometallic catalyst such as lead 2-ethylhexanoate in combination in order to complete the reaction in a short time. The amount of the catalyst to be used is preferably from 0.1 to 10 parts by mass per 100 parts by mass of the polyol compound.

Surfactant

The surfactant to be used in the present invention is not particularly limited. However, a silicone type surfactant is preferred, and particularly preferred is a surfactant having a high surfactanting effect, which is capable of reducing the cell diameter in order to impart heat-insulating properties. As a preferred example of the silicone type surfactant, one constituted by a polyoxyalkylene dimethylpolysiloxane copolymer may be mentioned.

Other Additives

In the present invention, optional additives may be used in addition to the above-described components. The additives may, for example, be a filler such as calcium carbonate or barium sulfate; an anti-aging agent such as antioxidant or an ultraviolet stabilizer; a flame retardant, a plasticizer, a colorant, an antifungal agent, a cell opener, a dispersing agent, a discoloration preventing agent, etc.

Method for Producing Rigid Polyurethane Foam

The method for producing a rigid polyurethane foam of the present invention comprises a step of reacting the polyol with the polyisocyanate compound in the presence of the amino-modified silicone, the catalyst, the blowing agent and the surfactant to obtain a foamed and cured rigid foam. Specifically, it may be a method employing a known foaming apparatus, or a method of carrying out usual handmix foaming without using such a foaming apparatus. As the foaming apparatus, a high pressure foaming apparatus, a low pressure foaming apparatus or a spray foaming apparatus to spray the material in the form of a mist, may be used. The reaction conditions may suitably be selected, but the reaction temperature is preferably from 10 to 30° C., more preferably from 15 to 30° C.

Rigid Polyurethane Foam

The rigid polyurethane foam obtainable by the method of the present invention preferably has a core density of from 10 to 50 kg/m$^3$, more preferably from 20 to 40 kg/m$^3$.

When the core density is at least 10 kg/m$^3$, a resin strength of a constant level can be obtained, and it is possible to readily obtain the effect of the present invention to maintain good dimensional stability. When it is at most 50 kg/m$^3$, the rigid urethane foam will be light in weight, whereby the raw material can be reduced, and it becomes possible to readily obtain the effect to reduce the cost. In this specification, the value of the core density is a value measured in accordance with JIS A9511.

The core density can be adjusted by the amount of the blowing agent to be used.

According to the present invention, it is possible to obtain a low density rigid foam excellent in dimensional stability, by permitting the amino-modified silicone to be present at the time of reacting the polyol with the polyisocyanate compound to form the rigid polyurethane foam. Thus, it is possible to obtain a rigid polyurethane foam which is light in weight as the density is low and which nevertheless is excellent in dimensional stability with a high cell strength. Further, it is possible to produce a rigid foam excellent in dimensional stability with a low density even by foaming by means of water alone. The reason is considered to be such that the amino-modified silicone presents an influence over the compatibility of the polyol and the polyisocyanate compound so as to form closed cells with good dimensional stability even with a low density. Further, good dimensional stability and excellent heat-insulating properties can be satisfied simultaneously. The reason is considered to be such that the distribution of cell diameters in the rigid foam is properly large, and relatively large closed cells contribute to the cell strength, and relatively small closed cells contribute to the heat-insulating properties.

EXAMPLES

Now, the present invention will be described in detail with reference to Examples. However, it should be understood that the present invention is by no means restricted by such Examples. In the following, "%" is "mass %" unless otherwise specified. Examples 1 to 6 are working examples of the present invention, and Examples 7 and 8 are comparative examples Amino-Modified Silicones In the following Examples, E1-1 to E1-3 and E2-1 used as amino-modified silicones are compounds represented by the above mentioned structural formula (1) or (2). In the structure of each compound (the structural formula (1) or (2)), $R^1$, $R^2$, $R^3$, $R^4$, $R^5$, k, m and n, and the amino equivalent are shown in the following Table 1.

TABLE 1

| Amino-modified silicone | E 1-1 | E 1-2 | E 1-3 | E 2-1 |
|---|---|---|---|---|
| Structural formula | Formula (1) | Formula (1) | Formula (1) | Formula (2) |
| $R^1$ | —(CH$_2$)$_3$— | —(CH$_2$)$_3$— | —(CH$_2$)$_3$— | — |
| $R^2$ | —C$_2$H$_5$ | —C$_2$H$_5$ | —C$_2$H$_5$ | — |
| $R^3$, $R^5$ | — | — | — | —CH$_3$ |
| $R^4$ | — | — | — | —(CH$_2$)$_3$NH—(CH$_2$)$_2$NH$_2$ |
| k | 13 | 10 | 44 | — |
| n | — | — | — | 52 |
| m | — | — | — | 1 |
| Amino equivalent (g/mol) | 3000 | 2500 | 10000 | 2100 |

Polyols

Polyols A to D used as the polyol, are as follows. Here, propylene oxide is abbreviated as PO, and ethylene oxide is abbreviated as EO.

Polyol A: A polyether polyol having a hydroxyl value of 350 mgKOH/g and an EO content of 33 mass % in the total of EO and PO, prepared by using tolylenediamine as an initiator and addition-polymer-zing EO, PO and EO thereto in this order.

Polyol B: A polyether polyol having a hydroxyl value of 350 mgKOH/g, obtained by addition-polymerizing EO to N-(2-aminoethyl)piperazine as an initiator.

Polyol C: A polyether polyol having a hydroxyl value of 380 mgKOH/g obtained by addition-polymerizing only PO to a mixture of sucrose and glycerin (5:4 by mass ratio) as an initiator.

Polyol D: A polymer-dispersed polyol having a hydroxyl value of 320 mgKOH/g and having dispersed therein a polymer (copolymer) obtained by copolymerizing an acrylonitrile monomer and a vinyl acetate monomer in a polyol mixture which the mixed ratio of comprising the following polyether polyol (d2) and a polyether polyol having a hydroxyl value of 760 mgKOH/g obtained by addition-polymerizing only PO to ethylenediamine as an initiator is 80:20 by mass ratio.

The polyether polyol (d2) is a polyether polyol having an oxyethylene group content of 41 mass % and a hydroxyl value of 360 mgKOH/g, obtained by using glycerin as an initiator and addition-polymerizing PO and EO to the glycerin.

Polyisocyanate Compound

As the polyisocyanate compound, polymethylenepolyphenyl polyisocyanate (so-called crude MDI) (tradename: MR-200, manufactured by Nippon Polyurethane Industry Co., Ltd.) was used. The amount of the polyisocyanate compound was adjusted so that the isocyanate index would be 110.

Catalyst

As the catalyst, N,N,N',N'-tetramethylhexanediamine (tradename: TOYOCAT-MR, manufactured by TOSOH CORPORATION) was used.

Blowing Agent

As the blowing agent, water was used.

Surfactant

As the surfactant, a silicone surfactant (tradename: SZ-1646, manufactured by Dow Corning Toray Co., Ltd.) was used.

Other Components

As a flame retardant, tris(2-chloropropyl)phosphate (tradename: TMCPP, manufactured by DAIHACHI CHEMICAL INDUSTRY CO., LTD.) was used.

Examples 1 to 8

In the blend ratio as shown in Table 2, components other than the polyisocyanate compound were well mixed and stirred by a stirrer to obtain a polyol system liquid.

The liquid temperature of both the polyol system liquid and the polyisocyanate compound was adjusted to 20° C., and then, they were mixed and stirred for 5 seconds at a rotational speed of 3,000 rpm. The obtained mixture was put into a wooden box of 200×200×200 (mm), and free foaming was carried out to obtain a rigid foam. In Table 2, parts by mass of the flame retardant, the blowing agent, the surfactant, the catalyst and the amino-modified silicone, per 100 parts by mass of the polyol, are shown, and the blend amount of the polyisocyanate compound is shown by an isocyanate index.

With respect to the obtained rigid foams, the following evaluations were carried out. The results are shown in Table 2.

Evaluation of Physical Properties of Rigid Foams

With respect to the obtained rigid foam (the rigid polyurethane foam), the core density (units: kg/m$^3$), the high temperature dimensional change (unit: %), the wet heat dimensional stability (unit: %), the thermal conductivity (unit: W/mK) at 24° C. as the heat-insulating properties, were measured by the following methods. Further, the dimensional stability was evaluated, based on the results of measurement of the high temperature dimensional change and the wet heat dimensional stability.

Dimensional Stability

The high temperature dimensional change was measured by a method in accordance with ASTM D 2126-75. As a sample, one cut out in a size of 100 mm in length×150 mm in width×75 mm in thickness was used. The test specimen was stored for 24 hours in an atmosphere of 70° C. for the high temperature dimensional stability, or in an atmosphere of 70° C. under a relative humidity of 95% for the wet heat dimensional stability, whereby the increased length (thickness) was represented by the change (unit: %) to the length (thickness) before the storage. Here, a negative numerical value means shrinkage, and the absolute value being large means a large dimensional change.

The dimensional change was evaluated with respect to the results of measurement of the high temperature dimensional change and the wet heat dimensional change by the following standards:

⊚: The maximum value among the absolute values of the respective changes in the length, width and thickness directions, is less than 1%.

◯: The maximum value is at least 1% and less than 5%.

Δ: The maximum value is at least 5% and less than 10%.

X: The maximum value is at least 10%.

Thermal Conductivity

The thermal conductivity (unit: W/m·K) at 24° C. was measured in accordance with JIS A1412 by means of a thermal conductivity-measuring apparatus (AUTO λ HC-074 model, manufactured by EKO Instruments Co., Ltd.). The smaller the value of this thermal conductivity, the better the heat-insulating properties.

TABLE 2

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Formulation | Polyol A | 40.8 | 40.8 | 40.8 | 40.8 | 40.8 | 40.8 | 40.8 | 40 |
| | Polyol B | 20.4 | 20.4 | 20.4 | 20.4 | 20.4 | 20.4 | 20.4 | 20 |
| | Polyol C | 38.8 | 38.8 | 38.8 | 38.8 | 38.8 | 38.8 | 38.8 | 35 |
| | Polyol D | | | | | | | | 5 |
| | Flame retardant | 10 | 10 | 10 | 10 | 10 | 10 | 10 | 10 |
| | Blowing agent (water) | 6 | 6 | 6 | 6 | 6 | 6 | 6 | 6 |
| | Surfactant | 1 | 1 | 1 | 1 | 1 | 1 | 1 | 1 |
| | Catalyst | 0.5 | 0.5 | 0.5 | 0.5 | 0.5 | 0.5 | 0.5 | 0.5 |
| | E1-1 | 0.05 | 0.1 | | | | | | |
| | E1-2 | | | 0.1 | | | | | |
| | E1-3 | | | | | 0.05 | | | |
| | E2-1 | | | | | | 0.05 | 0.1 | |
| | Isocyanate index | 110 | 110 | 110 | 110 | 110 | 110 | 110 | 110 |
| Evaluations | Core density (Kg/m$^3$) | 23.6 | 24.6 | 23.7 | 23.5 | 23.5 | 23.1 | 22.9 | 22.2 |
| | High temperature dimensional change at 70° C. for 24 hours (%) | Width (150 mm) | 0.4 | 0.4 | 0.9 | 0.6 | -0.9 | 0.1 | -20.8 | 0.6 |
| | | Thickness (75 mm) | -0.2 | 0.1 | 0.3 | -0.2 | -0.1 | 0.1 | -10.5 | 0 |
| | | Length (100 mm) | 0.2 | 0.2 | 0.5 | 0.2 | 0.1 | 0.6 | -13.5 | 0.5 |
| | Wet heat dimensional change at 70° C. under 95% for 24 hours (%) | Width (150 mm) | 0.1 | 0.2 | 0.3 | 0.5 | -3.4 | -2.5 | -18.5 | 0.6 |
| | | Thickness (75 mm) | 0.7 | 0.6 | 0.7 | 0.7 | 1 | 0.8 | -10.8 | 0.6 |
| | | Width (100 mm) | 0.2 | 0.4 | 0.3 | 0.5 | -1.4 | -1.5 | -20.5 | -0.9 |
| | Dimensional stability | ⊚ | ⊚ | ⊚ | ⊚ | ◯ | ◯ | X | ⊚ |
| | Thermal conductivity (W/mK) | 0.0249 | 0.0255 | 0.0247 | 0.0249 | 0.0241 | 0.0257 | 0.0236 | 0.0276 |

It is evident from the results in Table 2 that as compared with Example 7 wherein an amino-modified silicone was not incorporated, in Examples 1 to 6 wherein such a component was incorporated, the core density was low at the same level, and the dimensional stability was remarkable improved. This indicates that by an addition of the amino-modified silicone, good dimensional stability is obtainable even when foaming is carried out at a low density by using water as the blowing agent. Further, as the amount of the amino-modified silicone increases, the value of the thermal conductivity tends to be large. In Examples 1 to 6, better heat-insulating properties were obtained than in Example 8 wherein the polymer-dispersed polyol was b ended without using an amino-modified silicone.

INDUSTRIAL APPLICABILITY

The rigid polyurethane foam produced by the method for producing a rigid polyurethane foam of the present invention has good dimensional stability, while it is light in weight with a low density. Accordingly, it is useful for e.g. a buoyant material for boats or yachts, a core material constituting a sandwich panel, a core material of a FRP (fiber reinforced plastic) board, a float for hydroplane, a packing material for helm, etc.

Further, the rigid polyurethane foam of the present invention is not only light in weight with good dimensional stability, but also capable of attaining excellent heat-insulating properties. Accordingly, it is useful not only for a heat-insulating material for floors, ceilings or walls as a construction material for housings, etc. but also for a heat-insulating material for a cold storage warehouse or freezing container.

The entire disclosure of Japanese Patent Application No. 2006-312813 filed on Nov. 20, 2006 including specification, claims and summary is incorporated herein by reference in its entirety.

What is claimed is:

1. A method for producing a rigid closed-cell polyurethane foam, which comprises a step of reacting a polyol having a hydroxyl value of from 200 to 800 mgKOH/g and an average number of functional groups of from 3 to 6 with a polyisocyanate compound in the presence of an amino-modified silicone compound, a catalyst, a blowing agent and a surfactant, wherein the blowing agent is water and is present in an amount of from 4 to 12 parts by mass per 100 parts by mass of the polyol, wherein the amino-modified silicone compound is in an amount from 0.001 to 0.1 parts by mass per 100 parts by mass of the polyol and is at least one member selected from the group consisting of a compound represented by the following formula (1) and a compound represented by the following formula (2):

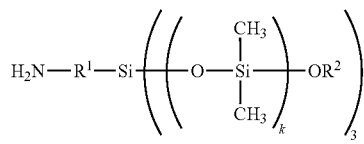

Formula (1)

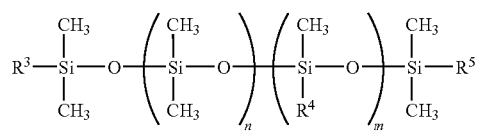

Formula (2)

wherein in the formula (1), $R^1$ is a $C_{1-10}$ alkylene group, $R^2$ is a $C_{1-10}$ alkyl group, and k is an integer of from 1 to 2,000, and in the formula (2), m is an integer of from 0 to 100, n is an integer of from 1 to 2,000, each of $R^3$, $R^4$ and $R^5$ which may be the same or different from one another, is a group selected from the group consisting of a $C_{1-10}$ alkyl group, a $C_{1-10}$ alkoxy group and a $C_{1-10}$ alkyl group having a nitrogen atom; provided that when m is 0, at least one of $R^3$ and $R^5$ is a $C_{1-10}$ alkyl group having a nitrogen atom, and when m is an integer of from 1 to 100, at least one selected from $R^3$, $R^5$ and $R^4$, is a $C_{1-10}$ alkyl group having a nitrogen atom;

wherein the rigid closed-cell polyurethane foam has a core density of from 20 to 40 kg/m³.

2. The method for producing a rigid polyurethane foam according to claim 1, wherein the amino-modified silicone has an amino equivalent of from 100 to 100,000 g/mol.

3. The method for producing a rigid polyurethane foam according to claim 1, wherein the polyol is a polyol containing a polyether polyol obtained by adding a compound having one three-membered cyclic ether to an initiator.

4. The method for producing a rigid polyurethane foam according to claim 1, wherein the initiator is a polyhydric alcohol, a polyhydric phenol or an amino compound.

5. The method for producing a rigid polyurethane foam according to claim 1, wherein the polyisocyanate compound is tolylene diisocyanate, diphenylmethane diisocyanate, a polymethylenepolyphenyl isocyanate or a modified product thereof.

6. The method for producing a rigid polyurethane foam according to claim 1, wherein the catalyst is triethylenediamine, bis(2-dimethylaminoethyl)ether, N,N,N',N'-tetramethylhexamethylenediamine or dibutyltin dilaurate.

7. A rigid polyurethane foam produced by the method for producing a rigid polyurethane foam as defined in claim 1.

8. The method for producing a rigid polyurethane foam according to claim 1, wherein the amount of the polyisocyanate is from 50 to 300 by isocyanate index, which represents 100 times the number of isocyanate groups to the total number of active hydrogens in the polyol compound and other active hydrogen compounds.

9. A method for producing a rigid closed-cell polyurethane foam, which comprises a step of reacting a polyol having a hydroxyl value of from 200 to 800 mgKOH/g and an average number of functional groups of from 3 to 6 with a polyisocyanate compound in the presence of an amino-modified silicone compound, a catalyst, a blowing agent and a surfactant, wherein the blowing agent is water and is present in an amount of from 4 to 12 parts by mass per 100 parts by mass of the polyol, wherein the amino-modified silicone compound is in an amount from 0.001 to 0.1 parts by mass per 100 parts by mass of the polyol and is at least one member selected from the group consisting of a compound represented by the following formula (1) and a compound represented by the following formula (2):

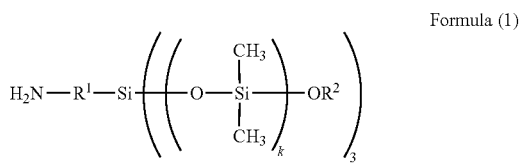

Formula (1)

-continued

Formula (2)

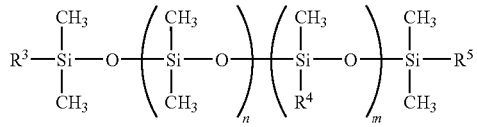

wherein in the formula (1), $R^1$ is a $C_{1-10}$ alkylene group, $R^2$ is a $C_{1-10}$ alkyl group, and k is an integer of from 1 to 2,000, and in the formula (2), m is an integer of from 0 to 100, n is an integer of from 1 to 2,000, each of $R^3$, $R^4$ and $R^5$ which may be the same or different from one another, is a group selected from the group consisting of a $C_{1-10}$ alkyl group, a $C_{1-10}$ alkoxy group and a $C_{1-10}$ alkyl group having a nitrogen atom; provided that when m is 0, at least one of $R^3$ and $R^5$ is a $C_{1-10}$ alkyl group having a nitrogen atom, and when m is an integer of from 1 to 100, at least one selected from $R^3$, $R^5$ and $R^4$, is a $C_{1-10}$ alkyl group having a nitrogen atom;

wherein the rigid closed-cell polyurethane foam has a core density of from 20 to 40 kg/m³;

wherein the polyurethane foam has a high temperature dimensional change as measured in accordance with ASTM D 2126-75, wherein the maximum value of dimensional change among absolute values of respective changes in length, width and thickness directions of a sample is less than 5%; and wherein the polyurethane foam has a thermal conductivity as measured at 24° C. in accordance with JIS A1412 of 0.0257 W/m·K or less.

10. The method for producing a rigid polyurethane foam according to claim 9, wherein the amino-modified silicone has an amino equivalent of from 100 to 100,000 g/mol.

11. The method for producing a rigid polyurethane foam according to claim 9, wherein the polyol is a polyol containing a polyether polyol obtained by adding a compound having one three-membered cyclic ether to an initiator.

12. The method for producing a rigid polyurethane foam according to claim 9, wherein the initiator is a polyhydric alcohol, a polyhydric phenol or an amino compound.

13. The method for producing a rigid polyurethane foam according to claim 9, wherein the polyisocyanate compound is tolylene diisocyanate, diphenylmethane diisocyanate, a polymethylenepolyphenyl isocyanate or a modified product thereof.

14. The method for producing a rigid polyurethane foam according to claim 9, wherein the catalyst is triethylenediamine, bis(2-dimethylaminoethyl)ether, N,N,N',N'-tetramethylhexamethylenediamine or dibutyltin dilaurate.

* * * * *